UNITED STATES PATENT OFFICE.

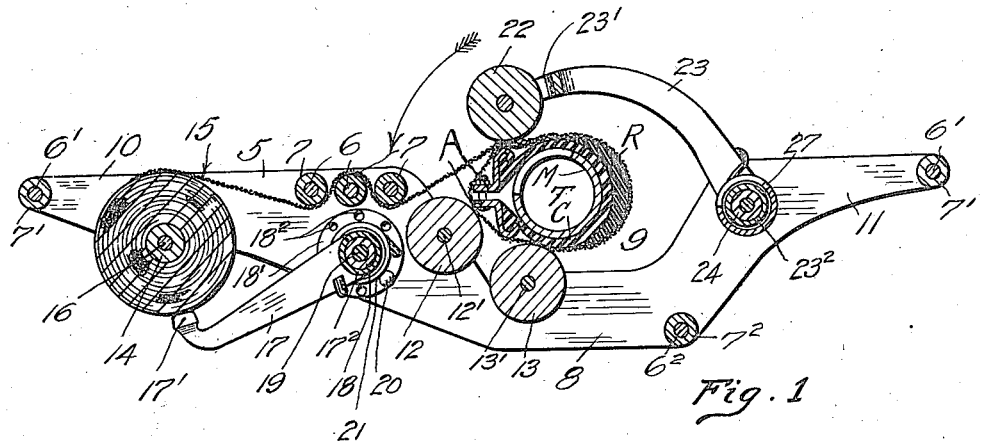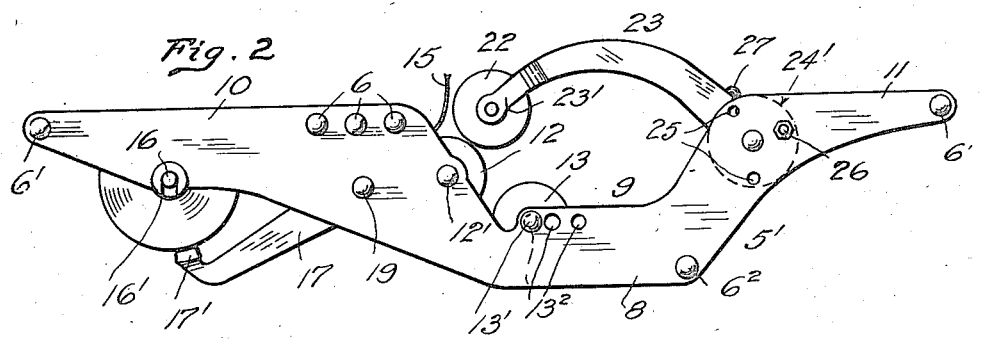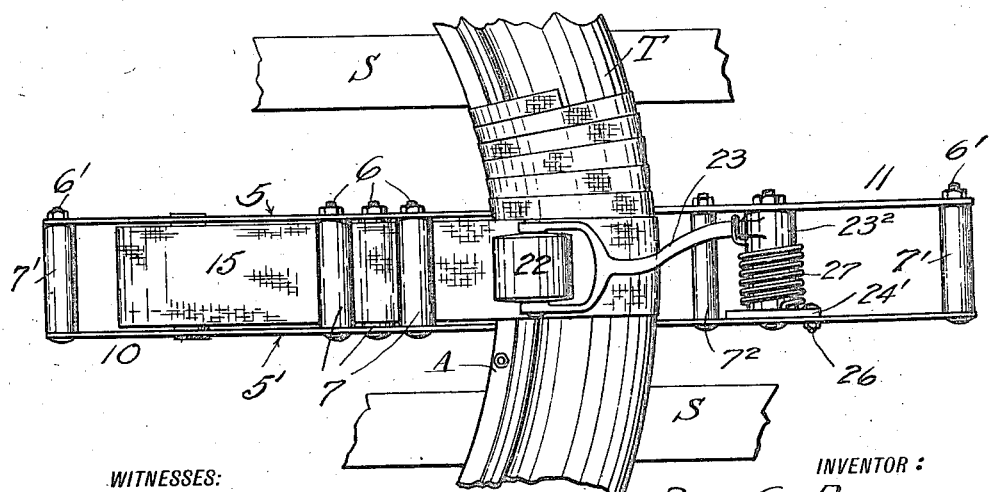

ROY G. ROSSMAN, OF SEATTLE, WASHINGTON.

TIRE-BANDAGE-WRAPPING MACHINE.

1,165,807.   Specification of Letters Patent.   Patented Dec. 28, 1915.

Application filed January 25, 1912. Serial No. 673,344.

*To all whom it may concern:*

Be it known that I, ROY G. ROSSMAN, a citizen of the United States, residing at Seattle, in the county of King and State of Washington, have invented certain new and useful Improvements in Tire - Bandage- Wrapping Machines, of which the following is a specification.

My invention relates to appliances which are utilized to wrap bandages about automobile tires for retaining rubber in position thereon under pressure as a preparatory step to vulcanizing the rubber.

Such operations are commonly performed either by the operator applying the bandages by simply wrapping them about a tire directly from his hands, or by the use of relatively large and expensive machines in which the tire is rotated coincidentally with the paying out of the bandage strip thereto from a reel mounted in a revolving carrier frame.

The object of the present invention is to provide a simple and inexpensively constructed machine and which is actuated manually by turning the same about a tire and in such manner as to effect the progressive travel of the machine and cause the bandage to be closely and tightly wrapped.

The invention consists in the novel construction, adaptation and combination of parts, as will be hereinafter described with reference to the accompanying drawings, in which—

Figure 1 is a longitudinal vertical section of a bandage wrapping machine embodying my invention, and shown applied. Fig. 2 is a side elevation of the machine. Fig. 3 is a plan view of Fig. 1.

In carrying out my invention I employ a bar or frame comprising two side plates 5 and 5' which are connected in spaced relation by means of bolts 6, 6' and $6^2$ passing respectively through tubular spacing pieces 7, 7' and $7^2$. Said side plates are each provided intermediate of its length with an offset portion 8 to afford a recess 9 between the extremities, or arms, 10 and 11 of a plate. The distance pieces 7' are disposed in proximity to the outer ends of said arms to serve as handles whereby the machine is manipulated, as will be presently explained.

The distance pieces 7 are arranged as shown in Fig. 1 and disposed adjacent to said recess. Projecting into the frame recess and at one end thereof are rollers 12 and 13 which are journaled on bolts 12' and 13' extending through holes provided in the frame plates. For regulating the position of the roller 13 to accommodate tires of various sizes a number of holes, as $13^2$, are provided to be selectively used as bearings for the bolt 13' and thus enable the roller 13 to be positioned at suitable distances from the other roller.

14 represents a spool or sleeve about which is wound a strip 15 of fabric, or an equivalent, to be used for bandaging a tire, such as T, Figs. 1 and 3.

The spool 14 is mounted upon a spindle 16 which is removably seated in apertures 16' provided therefor in the arms 10 of said frame plates at a distance from the pieces 7.

17 is an arm having at one end a hub $17^2$ mounted upon a bushing 18 which, in turn, is mounted upon a bolt 19 secured to the frame plates. Mounted upon one end of said bushing is an annular plate or ring 18' having therein a plurality of holes $18^2$ to selectively receive a securing bolt 20, when the plate is rotated to present a hole into register with a hole provided for the bolt in the frame plate against which said ring is juxtaposed. One of the holes $18^2$ also serves to receive the end of a helical spring 21 coiled about the hub $17^2$ of said arm while the other end of the spring engages over the arm 17 to press the free end 17' of the arm against the bandage strip on its spool for the purpose of effecting a tension on the strip as the same is unwound. Another roller 22 is provided to coact with the aforesaid rollers. The referred to roller is carried between the branches 23' of a bifurcated arm 23 which extends from a hub $23^2$. This hub, like that employed with the tensioning arm 17, is mounted on a bolt supported bushing 24. Similarly there is mounted thereon a ring 24' to serve, in conjunction with the holes 25 provided in frame plate 5', to receive a securing bolt 26; and likewise takes the end of a spiral spring 27 which tends to swing the arm 23 into the frame recess as illustrated in Fig. 2, or against a tire in opposition to the rollers 12 and 13 when in use.

The device being thus constructed, its operation is as follows: When a piece of rubber, or a combination of rubber and fabric, as indicated by R (Fig. 1) is to be joined with the tire casing C to provide a tread therefor about its outer periphery, the tread forming material is first applied casing and then tightly wrapped by bandage 15 so that the tread portion may be firmly held during the subsequent vulcanizing process when subjected to heat within a vulcanizing receptacle. In the accomplishment of such bandaging, the tire is protected against collapsing by means of an internal mandrel M and the inner ends of the casing are held in place by circular clamping members A as customarily used in the repairing of rubber tires. The tire thus clamped about the mandrel is placed horizontally upon a support, such as a pair of spaced horizontal bars S, the machine is applied to the work by moving the arm 23 so as to introduce the tire between the roller 22 and rollers 12 and 13. Upon the release of the arm, spring 27 asserts its power to cause the tire to be embraced by the rollers and have the machine be supported by the tire. A short length of strip 15 is now unwound from spool 16 and threaded about the tubular pieces 7, which serve as guides therefor, in the manner shown in Fig. 1, and thence the end of the strip is given a turn or two about the tire, the clamps and the tread R and the extreme end of the strip tucked beneath an overlapping portion. Thus arranged, by revolving the machine about the tire in the direction represented by the arrow in Fig. 1, the strip 15 will be forcibly drawn from the spool roll and wound tightly about the tire, etc. and be pressed thereagainst by the rollers which track against the strip as they travel in the direction in which the latter is applied. In such operations, the handles 7' at the opposite ends of the machine are successively grasped in the right and left hands of the operator whereby the referred to revolving movement of the machine is conveniently attained and with a mechanical advantage due to the leverage afforded by both of the frame-arms with respect to the couple constituted by the distance between the strip where it is led upon the tire and the roller which may be at the opposite side of the tire.

The operation of the machine, it is thought, will be obvious to those skilled in the art without further description.

The amount of tension or resistance applied from arm 17 to the roll of the bandage-strip will determine the strain under which the latter is applied to the tire, and to effect more or less compression by the bandage requiring only the adjustment of ring 18' to accordingly vary the power of the spring 21 which controls said arm. The office of the spring pressed arm 23 is to allow the roller 22 carried thereby to move toward or away from the other rollers to correspond to any irregularities in the tire by reason of its being of an irregular contour in cross section.

The machine may be operated without the yielding roller 22, as the strain upon the bandage strip will serve to hold the rollers 12 and 13 against the work, but I have found in practice that the bandaging of a tire is more conveniently and less laboriously performed when the machine is provided with the yielding roller, and the same is preferably used.

The invention is extremely simple in its construction and is peculiarly adapted to the purposes for which intended.

What I claim, is—

1. A machine of the class described, having a frame, rollers carried by the frame and arranged for supporting the machine when tracking against a tire when the machine is revolved about the latter, and a spool mounted in the frame and carrying a bandaging strip which is paid out from the spool when the machine is revolved to cause said strip to be wound about the tire said frame carrying a rotary element traversing, or tracking, and exerting pressure upon said bandage strip simultaneously with its application to the tire.

2. A tire-bandaging machine of the type described, including a member equipped with rotary elements for supporting the machine and with an opposed rotary element simultaneously traversing and exerting pressure upon the bandaging strip as the latter is applied to, and as the machine is tracking the tire, the machine being adapted to revolve about the latter, a spool mounted in said member and carrying a bandaging strip which is paid out from the spool when the machine is revolved, to cause the winding of the strip about the tire, a tension device, carried by said first referred to member, for resisting the unwinding of the strip from said spool.

3. In a tire bandaging machine of the class described, the combination with the frame adapted to be revolubly moved about a tire, said frame comprising two side plates held in spaced relation by interposed distance pieces, of rollers carried by the frame intermediate its length and positioned between the side plates thereof, and a roll of bandage material carried by the frame at a distance from said rollers said frame carrying a rotary element traversing or tracking and exerting pressure upon the bandaging strip simultaneously with its application to the tire.

4. In a tire-bandaging machine of the class described, the combination of a frame, a spool in said frame, rollers carried by the frame intermediate its length, and regulating the relative positions of the machine with respect to a tire, guide elements secured to the frame intermediate said roller and the spool, and spring actuated tension devices for retarding the delivery of a bandage strip from said spool, said frame carrying a rotary element traversing or tracking and exerting pressure upon the bandaging strip simultaneously with its application to the tire.

5. In a tire-bandaging machine of the class described, the combination of a frame, a spool arranged to be removably mounted in said frame, rollers carried by the frame intermediate its length, a spring pressed arm supporting one of said rollers, guide elements secured to the frame intermediate said spring pressed roller and the spool, and spring actuated tension devices for retarding the delivery of a bandage strip from said spool said frame carrying a rotary element traversing or tracking and exerting pressure upon the bandaging strip simultaneously with its application to the tire.

6. In a tire-bandaging machine of the class described, the combination of a frame provided with handles at its ends, a spool arranged to be removably mounted in said frame, rollers carried by the frame intermediate its length, another roller, a spring pressed arm supporting the last named roller, said spring-pressed arm-supported roller traversing or tracking, and exerting pressure upon the bandaging strip simultaneously with its application to the tire guide elements secured to the frame intermediate said roller and the spool, and spring actuated tension devices for retarding the delivery of a bandage strip from said spool.

7. A tire-bandaging machine comprising a plurality of side plates held in spaced relation, a revoluble member mounted therebetween adapted to support a spool of bandage, said plates being recessed intermediate of their ends to receive a tire or other object, and tension devices positioned on opposite sides of said recessed portions, one of said tension devices adapted to retard the unwinding of said bandage, and the other of said tension devices adapted to yieldingly bear upon the bandage as it is wound on a tire or other object.

8. In an implement of the class described, the combination of an element having two side members, said side members being recessed intermediate their ends, a spool detachably connected to said element intermediate the side members thereof, and spring controlled tension devices mounted on opposite sides of the recessed portions of said side members, one of said tension devices adapted to retard the delivery of a bandage strip as the same is paid out from said spool during the progressive movement of the implement, and the other of said tension devices adapted to yieldingly bear upon the bandage as it is wound on a tire or other object.

9. A tire-bandaging machine comprising a plurality of side plates held in spaced relation, said side plates being recessed intermediate of their ends, a spool of bandage positioned between said plates and near one end of said machine, a brake coöperating therewith to retard the unwinding of said bandage, a plurality of rollers mounted between said plates adapted to guide said bandage, tracking members mounted within the recessed portions of said plates and between said plates adapted to move circumferentially about a tire or other object, one of said tracking members being adjustable, and a tension device adapted to yieldingly bear upon the bandage as it is wound on a tire or other object, the frictional force exerted thereby being in a direction opposite to that in which the bandage is traveling.

Signed at Seattle Wash., this 13th day of Jan., 1912.

ROY G. ROSSMAN.

Witnesses:
  Pierre Barnes,
  E. Peterson.